(12) United States Patent
Mannette et al.

(10) Patent No.: US 6,975,652 B1
(45) Date of Patent: Dec. 13, 2005

(54) CLOCK SYNCHRONIZATION OF HFC TELEPHONE EQUIPMENT

(75) Inventors: Michael R. Mannette, Rolling Meadows, IL (US); Douglas J. Newlin, Wheaton, IL (US)

(73) Assignee: 3Com Corporation, Marlborough, MA (US)

( * ) Notice: Subject to any disclaimer, the term of this patent is extended or adjusted under 35 U.S.C. 154(b) by 1014 days.

(21) Appl. No.: 09/691,489

(22) Filed: Oct. 18, 2000

(51) Int. Cl.[7] ............................................. H04J 3/06
(52) U.S. Cl. ..................................... 370/503; 370/516
(58) Field of Search ........ 370/503–519; 375/354–371; 327/141–163

(56) References Cited

U.S. PATENT DOCUMENTS

| | | | | |
|---|---|---|---|---|
| 4,849,969 A | 7/1989 | Annamalai | ................. | 370/517 |
| 4,866,704 A | 9/1989 | Bergman | .................... | 370/452 |
| 4,961,188 A | 10/1990 | Lau | ............................ | 370/517 |
| 5,255,291 A | 10/1993 | Holden et al. | ............. | 375/362 |
| 5,361,261 A | 11/1994 | Edem et al. | ................ | 370/445 |
| 5,450,450 A | 9/1995 | Lee | ............................. | 375/354 |
| 5,790,538 A | 8/1998 | Sugar | ......................... | 370/352 |
| 5,790,543 A * | 8/1998 | Cloutier | ..................... | 370/252 |
| 6,266,384 B1 * | 7/2001 | Acampora et al. | ......... | 375/363 |
| 6,347,084 B1 * | 2/2002 | Hulyalkar et al. | .......... | 370/347 |
| 6,429,902 B1 * | 8/2002 | Har-Chen et al. | ........... | 348/518 |
| 6,449,291 B1 * | 9/2002 | Burns et al. | ............... | 370/516 |
| 6,698,022 B1 * | 2/2004 | Wu | ............................. | 725/111 |
| 6,744,697 B2 * | 6/2004 | Mitra et al. | .................. | 368/46 |
| 2001/0043622 A1 * | 11/2001 | Bernath et al. | ............. | 370/516 |

* cited by examiner

Primary Examiner—Frank Duong
Assistant Examiner—Michael J. Moore
(74) Attorney, Agent, or Firm—McDonnell Boehnen Hulbert & Berghoff LLP

(57) ABSTRACT

A method and system for synchronizing two clocks of a first and second device. Successive synchronization messages are sent from the first device to the second device. Each synchronization message has a timestamp. Each message is received at the second device and the period between successive timestamps is determined. The period of the second clock of the second device is also determined. The period between timestamps is compared with the period of the second clock of the second device. The period of said second clock is adjusted based upon the comparison.

9 Claims, 7 Drawing Sheets

CLOCK SYNCHRONIZATION OF HFC TELEPHONE EQUIPMENT

FIELD OF THE INVENTION

This present invention relates to methods and systems for synchronizing clocks. More specifically, it relates to synchronizing clocks across a Hybrid Fiber Coax (HFC) network.

BACKGROUND OF THE INVENTION

Packet telephone networks have the potential to replace current circuit-switched telephone networks. For example, Hybrid Fiber Coax (HFC) networks have the potential to replace the current telephone local loop. To achieve this goal, the HFC telephone network needs to provide services similar to services on the current circuit-switched telephone network.

One such service is the ability of the current telephone network to carry FAX and voice band modem data. To be competitive with current telephone networks, the HFC telephone network should be capable of carrying FAX and voice band modem data at a performance level comparable to that of the current circuit-switched telephone network. The ability of the HFC network to carry FAX and voice band modem data depends on its ability to minimize frame slips.

Another service on current telephone networks allows the current telephone network to deliver high quality speech free of interference (e.g., pops and clicks). To be competitive with current telephone networks, the HFC telephone networks should be capable of delivering high quality speech at a performance level comparable to that of the current circuit-switched telephone network. The ability of the HFC network to deliver high quality speech depends on its ability to minimize packet loss. This is particularly true when speech compression is used to reduce bandwidth.

Networks may often be classified as synchronous, plesiochronous, or asynchronous. In synchronous networks the sampling, reconstruction and the transport mechanism operate at exactly the same rate. However, there may be a phase difference between clocks within the network due to propagation time delays or jitter introduced by the network. In a synchronous network, clocks are traceable to one primary reference clock (PRC). The accuracy of the PRC is typically better than +/−1 in $10^{11}$ and is derived from a cesium atomic clock (i.e. a Stratum 1 level).

In plesiochronous networks, the sampling, reconstruction and the transport mechanisms operate at almost the same rate with any variations being constrained within a tight tolerance. Also, the two networks derive their clocks from two different PRCs. Although these clocks are extremely accurate, there is a difference between clock periods. Typical clock accuracy of plesiochronous networks is between +/−1.6 in $10^8$ (i.e. a Stratum 2 level) and +/−4.6 in $10^6$ (i.e. a Stratum 3 level).

In the case of asynchronous networks, the sampling, reconstruction and the transport mechanisms operate at nominal rates. In asynchronous networks, the difference between two clocks is much greater than the plesiochronous clock difference. For example, if two clocks are derived from free-running quartz oscillators, they can be described as asynchronous. Asynchronous networks typically maintain clock accuracy less than the Stratum 3 level.

Depending upon the network or networks used, frame slip or packet loss may occur. A frame refers to the amount of data associated with a speech sample, for example, a G.711 CODEC speech sample. When a frame slip occurs, speech is lost.

A packet refers to the amount of data carried between a header and trailer. For example, a VoIP packet typically contains many speech samples and a packet loss results in the loss of many speech samples. In another example, a G.711 CODEC samples speech every 125 microseconds, aggregating eighty samples into a single packet generated every 10 milliseconds. Therefore, a packet loss results in the loss of eighty G.711 CODEC speech samples and this represents eighty frame slips.

SUMMARY OF THE INVENTION

The invention relates to a system and method that synchronizes two clocks operating across a Hybrid Fiber Coax (HFC) network.

In one embodiment of the present invention, a cable telephone modem (CTM) is coupled to a HFC network. The HFC network may be coupled to a cable modem termination system (CMTS), and a cable modem (CM). The CMTS may be coupled to a packet network. The packet network may be coupled to a variety of devices including backend servers, call management servers and a PSTN gateway. The PSTN gateway may be coupled to a PSTN.

The CMTS generates an informational flow to the CM or CTM. This informational flow may contain synchronization messages and data. The synchronization messages may include a timestamp. The timestamps indicate the time (at the CMTS) when the synchronization message was sent from the CMTS to the CTM or the CM. Hence, the time between timestamps may indicate the period of the clock at the CMTS.

The CTM or the CM receives the synchronization messages and determines the period ("the synchronization period") between timestamps in consecutive synchronization messages. The CTM or the CM also has a local clock with a period. The synchronization period is compared with the period of the local clock. Based upon the results of the comparison, the value of the local clock may be adjusted.

In another embodiment of the present invention, the CM or the CTM receives the data from the CMTS. The data has a rate. The rate may be a high value or a low value. If the value is too high, for example, registers in the CM or the CTM may overflow as the data arrives. The CM or the CTM adjusts the value of the local clock in the CM or the CTM based upon the rate of the incoming data.

The foregoing and other features and advantages of an illustrative embodiment of the present invention will be more readily apparent from the following detailed description, which proceeds with references to the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Figure 1:
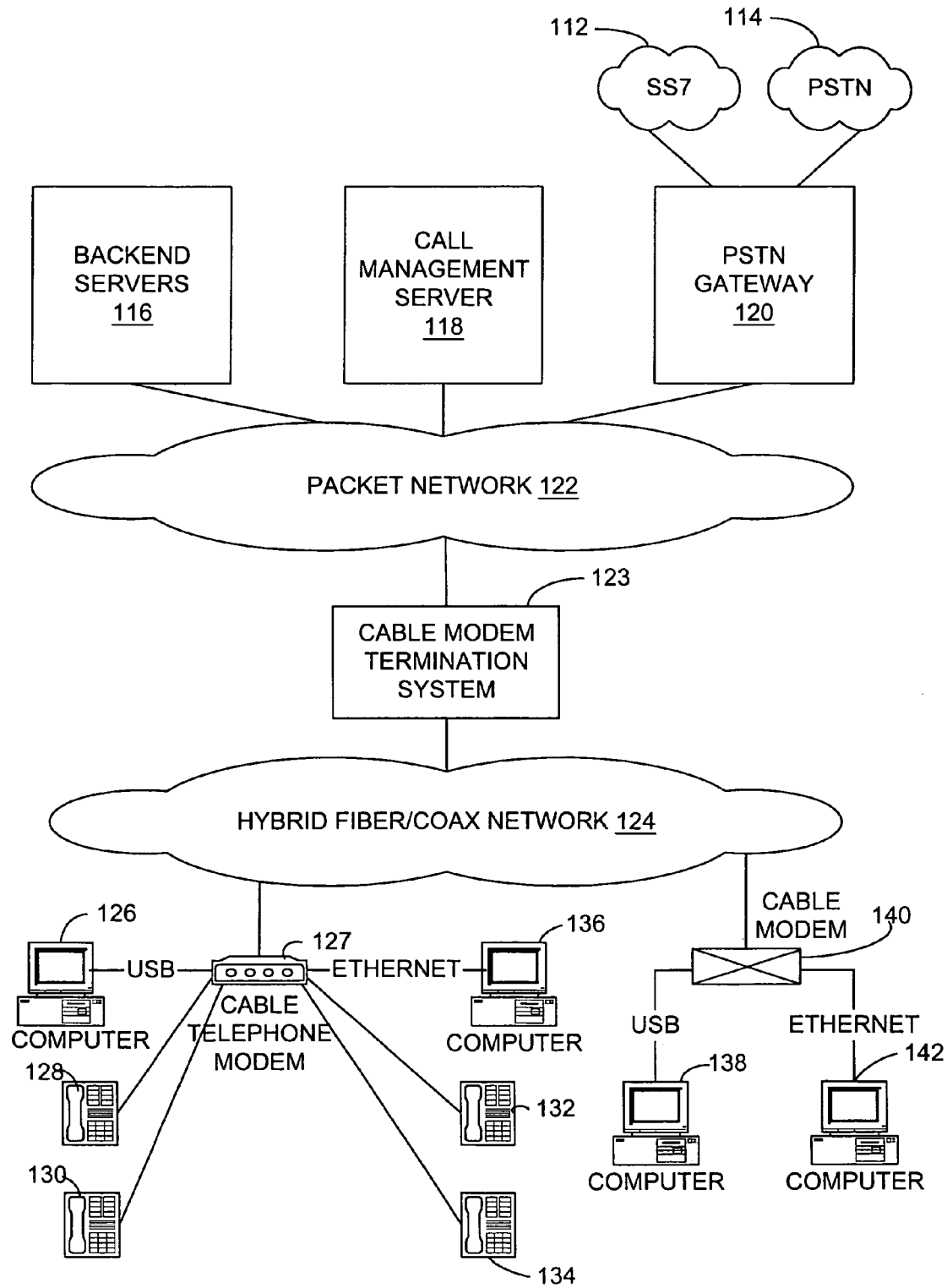
FIG. 1 is a block diagram of a network in accordance with a preferred embodiment of the present invention.

Referring now to FIG. 1, a HFC telephone system supporting packet based data and telephone services is described.

A PSTN gateway 120 is coupled to a Signaling System 7 (SS7) network 112 and a Public Switched Telephone Network (PSTN) 114. The PSTN gateway 120 is coupled to a packet network 122. The packet network 122 is coupled to backend servers 116, a Call Management Server (CMS) 118, and a Cable Modem Termination System (CMTS) 123.

The CMTS 123 is coupled to a Hybrid Fiber Coax (HFC) network 124. The HFC network 124 is coupled to a Cable Modem (CM) 140 and a Cable Telephone Modem (CTM) 127.

The CTM 127 is coupled to telephones 128, 130, 132 and 134. In addition, the CTM 127 is coupled to a computer 126 and a computer 136. The CM 140 is coupled to a computer 138 and a computer 142.

The PSTN gateway 120 provides a bridging function between the PSTN 114 and the packet network 122. For example, the PSTN gateway 120 allows telephone calls originated in the CTM 127 to be terminated with telephones connected to the PSTN 114. Likewise, the PSTN gateway 120 allows calls originated in the PSTN 114 to be terminated on the CTM 127. Other functions of the PSTN gateway 120 are possible.

The SS7 network 112 provides signaling functions between the PSTN 114 and the packet network 122. The SS7 network 112 may be composed of a variety of nodes, for example, Signaling Control Points and Signaling Transfer Points. Other types of signaling systems may also be used.

The PSTN 114 is a public-switched telephone network. Various devices or networks may be connected to the PSTN 114. For example, telephones may be connected to the PSTN 114. In addition, the PSTN may be connected to a wireless network. Other examples of devices and networks are possible.

The Call Management Server (CMS) 118 is a device used to control telephone signaling within the HFC network 124. Functions performed by this device may include digit analysis, the mapping of dialed digits to IP addresses, user authorization of a class of service, and the authorization of the quality of service. The CMS 118 may also receive call control messages, for example, off-hook and dialed digits, from the CTM 127 and may also send access network bandwidth reservation requests to the CMTS 123 in support of authorized telephone services. Of course, the CMS 118 may perform other functions as well.

The back end servers 116 may represent a variety of devices providing support services for the HFC network components. These components and services may include Dynamic Host Configuration Protocol (DHCP), Domain Name Server (DNS), Trivial File Transfer Protocol (TFTP), billing servers, provisioning servers and login servers. Other examples of components and services are possible.

The packet network 122 may be any type of network, which transports IP data. The network may be any type of packet network including an ATM or frame relay network. Other examples of packet networks are possible. The packet network 122 may contain routers or similar devices for directing traffic among IP end points. The packet network may contain other devices that provide additional functions, as well.

The CMTS 123 is a device that bridges the packet network 122 and the HFC network 124. In addition to bridging data between the HFC network 124 and the packet network 122, the CMTS 123 receives HFC access request from the CTM 127 and the CM 140 and assigns each CTM or CM upstream channel(s) for the transmission of data on the HFC network 124. The channel assignment sent by the CMTS 123 informs the CTM 127 or CM 140 of the time interval and the frequency for data transmission.

The HFC network 124 may be a two-way, cable TV-capable network that utilizes broadcast downstream transmission and a combination of FDM/TDMA for upstream transmission to provide voice and data services. The HFC network 124 may use specific upstream cells (request intervals) for transmitting HFC upstream access request messages from the CTM 127 or CM 140 to the CMTS 123. Transmissions on the request intervals utilize a back-up and retransmission method to resolve contention between the CTM 127 or the CM 140. In addition to requesting intervals, the CMTS 123 may use specific cells for the retransmission of data and voice (data intervals). For example, these cells may be two-dimensional and may be composed of a time interval for each transmission and a frequency for each transmission.

The CTM 127 bridges one or more telephone lines of telephone service and one or more data services to the HFC network 124. The CTM 127 may be implemented as a CM with an external device providing one or more plain old telephone service (POTS) lines (e.g., a Media Terminal Adapter (MTA)) or may be implemented as a CM 140 with embedded POTS line capabilities. Additionally, the CTM 127 may include no data service capabilities. The CTM 127 receives data from the computers 126 or 136, requests permission to transmit on the HFC 124, and when granted access, transmits data from the computers 126 or 136 to the CMTS 123 via the HFC network 124. Other implementations and other capabilities are possible for the CTM 127.

The CTM 127 may receive off-hook notification from the telephone 128, 130, 132, and 134, requests permission to transmit on the HFC 124 and, when granted access, transmits various data from the telephones 128, 130, 132, and 134 to the CMTS 123 via the HFC 124. The CMT may forward data or voice data to the computer 126 or 136, or the telephones 128, 130, 132, or 134. The CTM 127 also may provide digit collection, audible tone generator, echo cancellation, audio compression, audio expansion, fax detection, TDD detection, and voice band modem detection. Additional functions of the CTM 127 are possible.

The CM 140 bridges one or more data services to the HFC network 124. The CM 140 receives data from computers, requests permission to transmit the data on the HFC network 124 and, when granted access, transmits the data from the computer 138, or 142 to the CMTS 123 via the HFC network 124. The CM 140 also receives data transmitted from the CMTS 123 via HFC network 124 and forwards the data to the computers 138 or 142. The CM 140 may provide other functions, as well.

The computers 126, 136, 138, and 142 are any type of device capable of transmitting and receiving data from a user. The computers 126, 136, 138, and 142 may provide a Graphical User Interface (GUI) to a user or users. The computers 126, 136, 138, and 142 may provide other functions, as well.

The telephones 128, 130, 132, and 134 are any type of device capable of transmitting or receiving voice messages, data or both voice messages and data from a user. The telephones 128, 130, 132, and 134 may provide a user interface to a user. Additional telephones are possible as well.

Figure 2:
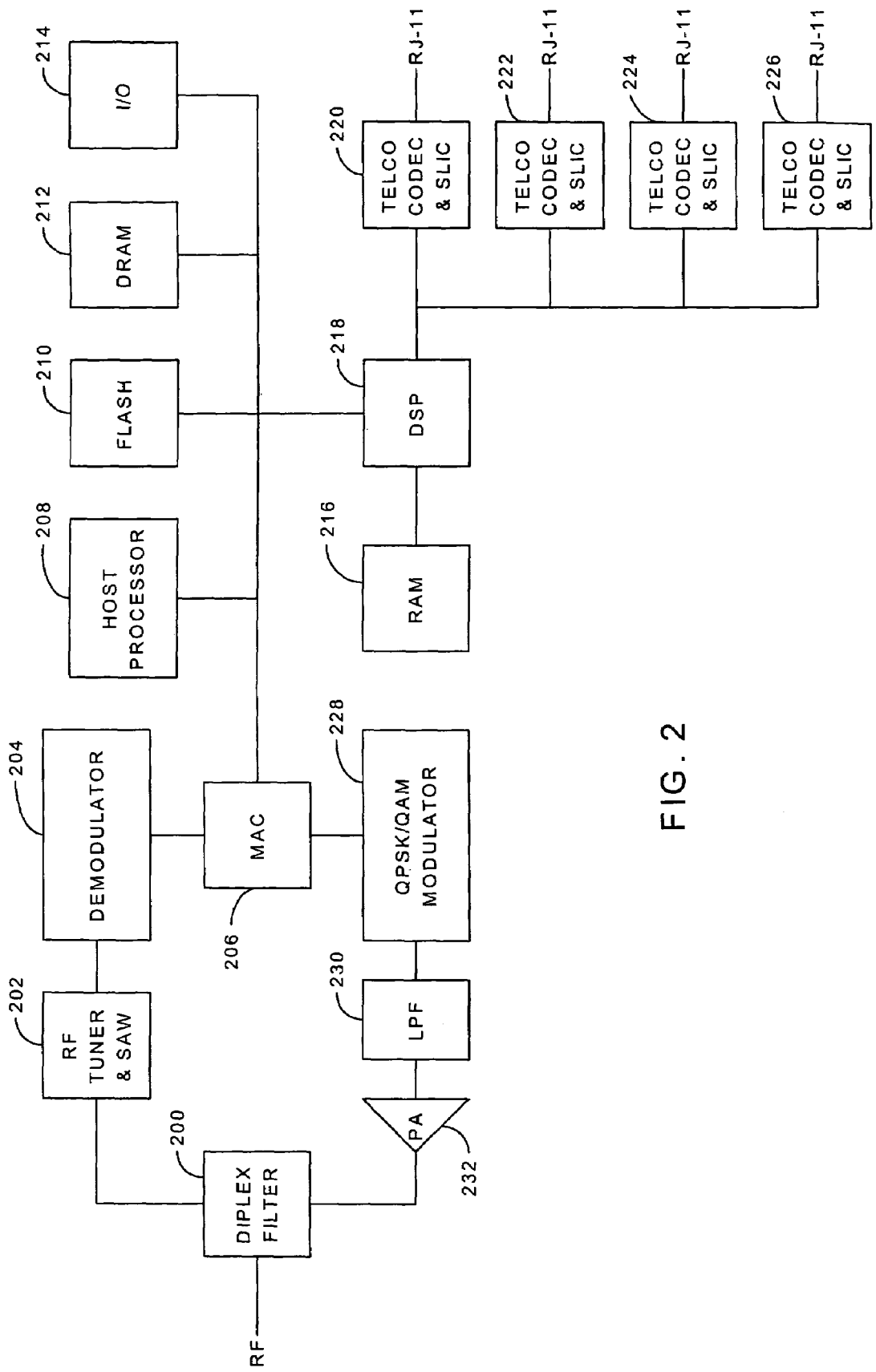
FIG. 2 is a diagram illustrating the cable telephone modem (CTM) in accordance with a preferred embodiment of the present invention.

Referring now to FIG. 2, a block diagram of the CTM is described. In one illustrative example, the CTM is capable of providing multi-media services. The CTM may receive RF signals in the frequency range of 50 to 750 MHz on the RF input and transmit RF signals in the frequency range of 5 to 40 MHz. Other frequency ranges are possible. The RF input is typically connected to the HFC network using a coaxial cable. Other types of connections are also possible.

A diplex filter 200 is coupled to an RF Tuner and SAW filter 202. The RF Tuner and SAW filter 202 is coupled to a demodulator 204. The demodulator 204 is coupled to a MAC 206.

The MAC 206 is coupled to a QPSK/QAM modulator 228. The QPSK/QAM modulator 228 is coupled to a Low Pass Filter (LPF) 230. The LPF 230 is coupled to a Power Amplifier (PA) 232. The PA 232 is coupled to the diplex filter 200.

The MAC 206 is also coupled to a host microprocessor 208, flash memory 210, DRAM 212, I/O block 214, and DSP 218. The DSP 218 is coupled to a RAM 216 and CODEC and Subscription Line Interfaces (SLICs) 220, 222, 224, and 226. Additional CODECS and SLICs are possible as well.

A diplex filter 200 separates the input RF signals, for example, in the frequency range of 50 to 750 MHz, from the output signals and delivers the input RF signals to the RF tuner and SAW filter 202. The RF tuner and the SAW filter 202 down-converts the RF signals to IF frequencies. The down conversion process applies the RF input signals to the RF Tuner and SAW filter 202 and produces IF signals that are delivered to the demodulator 204.

The demodulator 204 produces the recovered bit stream from the IF input signal and the demodulation process recovers the bit steam. The recovery process may include analog-to-digital conversion, receiver amplitude correction, echo cancellation, timing tracking, frequency correction, and slicing. Other recovery techniques are possible.

The MAC 206 accepts the recovered bit stream from the demodulator and formats the bit stream into blocks for delivery to the host microprocessor 208. In addition to formatting the recovered bit stream, the MAC 206 may perform error detection and correction on the recovered bit stream. The MAC 206 may also perform decryption functions if the bit stream is encrypted. The MAC 206 also accepts data to be transmitted from the host microprocessor 208. Prior to delivering the transmit data to the modulator 228, the MAC 206 may add a cyclic redundancy code (CRC) to the transmit data block and may encrypt the transmit block. The MAC 206 sends data to the modulator 228 based on timing information extracted from the recovered bit stream.

The modulator 228 performs digital QPSK or QAM modulation on the bit stream from the MAC 206. The modulator 228 may also include a pre-equalization function. After digitally modulating the transmit bit steam, the modulator 228 converts the stream to the analog domain using a digital-to-analog converter.

The conversion of the digital signals to analog signals may produce unwanted harmonic artifacts. As such, the signals from the modulator 228 are filtered using the low pass filter (LPF) 230 to remove the unwanted artifacts. After removing the unwanted harmonics, the analog signals are amplified using the variable gain power amplifier (PA) 232. The output of the PA 232 is then sent to the diplex filter 200, which provides an interface to a coaxial cable.

The host processor 208 may be any general purpose microprocessor used to process upstream and downstream data. For example, the processor 208 may perform tasks associated with bridging Internet Protocol (IP) data between the I/O device 214 and the HFC network. The host processor 208 may also request to access network resources. The access requests may have several different forms. For example, a data service request message (BES-REQ), dynamic service addition request (DSA-REQ), dynamic service change request (DSC-REQ) and dynamic service deletion request (DSD-REQ). Other formats are also possible.

The CTM may also be responsible for receiving control messages from the CMTS and taking appropriate action based on these messages. For example, the control messages may include a transmission control message also known as an upstream map message (MAP) that contains transmission information for the upstream and an upstream channel change message (UCC-REQ) that indicates that the CTM should transmit on a new upstream frequency. Other types of messages with other formats are possible.

The host processor 208 may also send telephone call control messages such as on-hook, off-hook, and dialed digits to the CMS. These call control messages stimulate the CMS to send gate messages to the CMTS. Additionally, the host processor 208 interfaces to the DSP 218 and may control the DSP functions. A special feature of the host processor 208 may be issuing a DSC-REQ message when a fax or TDD device is detected by the DSP 218. In addition, the processor 208 may use volatile memory, non-volatile memory or any combination of volatile and non-volatile memory. Non-volatile memory information and instructions for the host processor 208 may be stored in the FLASH memory 210. Volatile information and instructions for the host processor 208 may be stored in the dynamic random access memory (DRAM) 212.

The DSP 218 may be any special-purpose microprocessor that performs digital signal processing (DSP) functions on the voice signals. These signals include voice data compression and expansion, voice echo cancellation and conversion to and from PCM data representation. Additionally, the DSP 218 may provide a variety of tone generation and detection features such as dial tone synthesis, FAX detection, TDD detection and DTMF detection. Other features are possible. Volatile information and instructions for the DSP processor may be stored in the random access memory (RAM) 216. Other types of memory may also be used.

The CODECs and SLICs 220, 222, 224, and 226 are provided for each line of the telephone service. These devices convert voice signals to and from the analog domain. The CODECs and SLICs interface the DSP 218 to the subscriber line interface (SLIC) device. The SLICs translate voice signals suitable for the CODECs to those suitable for interfacing with a telephone. Additionally, the SLICs have the ability to produce signals needed to ring a telephone.

The I/O device block 214 may include a variety of input and output devices. For example, this block may include circuitry necessary for interfacing a 10 or 100baseT Ethernet and may include circuitry necessary for interfacing to a universal serial bus (USB). Other examples of circuitry or devices are possible.

Figure 3:
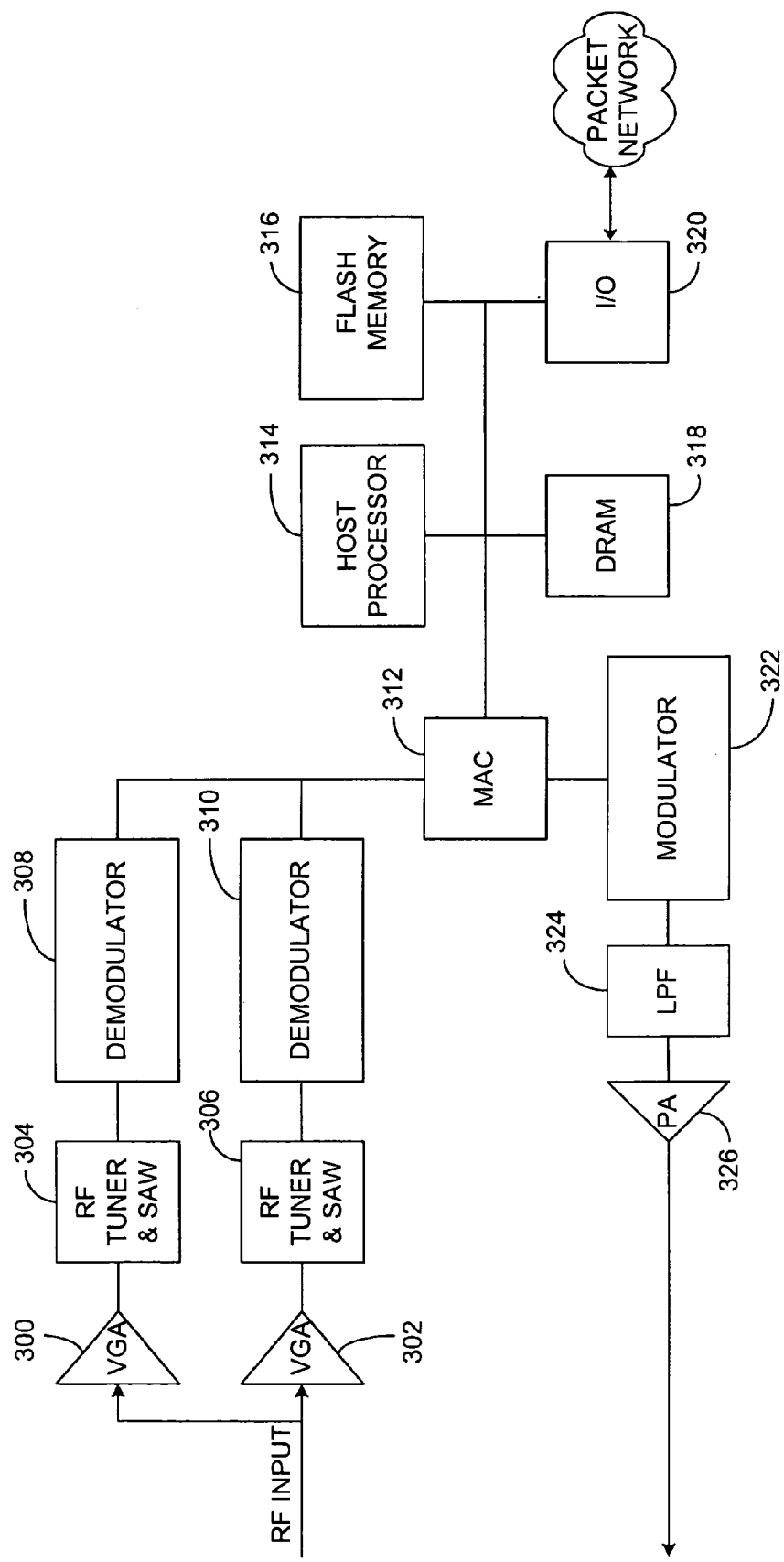
FIG. 3 is a diagram illustrating the cable modem termination system (CMTS) in accordance with a preferred embodiment of the present invention.

Referring now to FIG. 3, the CMTS is described. The CMTS transmits RF signals, for example, in the frequency range of 50 to 750 MHz, and receives signals in the ranges of 5 to 40 MHz. Other frequency ranges are possible. The RF input is connected to the HFC network through an external diplex filter (not shown). The CMTS RF input and RF output are connected to the HFC network using a diplex filter. The diplex filter may be used, for example, to extend the CMTS such that the RF output frequency can be set to, for example, an unused television channel.

A first Variable Gain Amplifier (VGA) 300 is coupled to a first RF tuner and SAW filter 304. A second VGA 302 is coupled to a second RF tuner and SAW filter 306. The first RF tuner and SAW filter 304 is coupled to a first demodulator 308. The second RF tuner and SAW filter 306 is coupled to a second demodulator 310. The demodulators 308 and 310 are coupled to a MAC 312.

The MAC 312 is coupled to a processor 314, a flash memory 316, a DRAM 318, an I/O block 320, and a modulator 322. The modulator 322 is coupled to a Low Pass Filter (LPA) 324 and a Power Amplifier (PA) 326.

The CMTS provides a receiver composed of the variable gain amplifiers (VGAs) 300 and 302, RF Tuner and SAW filters 304 and 306 and demodulators 308 and 310 for each upstream frequency. The number of receivers provided by a CMTS may vary based on the exact upstream bandwidth requirements of the system and a typical CMTS may provide from one to eight receivers. Other numbers of receivers are possible. Additionally, the CMTS may utilize several MAC devices to support any number of upstream channels. The CMTS may also be configured to except several RF input signals and the RF splitter may be external to the CMTS.

The VGAs 300 and 302 adjust the amplitude of the RF input signal and the amplified signal is delivered to the RF tuner and SAW filters 304 and 306. The tuner and SAW filters 304 and 306 down-convert the RF signals to IF frequencies. This down conversion process applies the RF input signals to the RF tuner and SAW filters 304 and 306, and produces IF signals that are delivered to the demodulators 308 and 310.

The demodulators 308 and 310 produce the recovered bit stream from the IF input signal and the demodulation process recovers the bit stream. For example, the process may use analog-to-digital conversion, receiver amplitude correction, echo cancellation, timing tracking, frequency correction, and slicing. Other techniques are possible.

The MAC 312 accepts the recovered bit stream from the demodulators 308 and 310 and formats the bit stream into blocks for delivery to the host microprocessor 314. In addition to formatting the recovered bit stream, the MAC 312 may perform error detection and correction on the recovered bit stream. The MAC 312 may perform decryption functions if the bit stream is encrypted. The MAC 312 also accepts data to be transmitted from the host microprocessor 314. Prior to delivering the transmit data to the modulator 322, the MAC 312 may add a cyclic redundancy code (CRC) to the transmit data block and may encrypt the transmit block. Additionally, the MAC 312 sends upstream timing and control information to the modulator 322.

The modulator 322 performs digital QAM modulation on the bit stream from the MAC 312. The modulator 322 may also include a pre-equalization function. After digitally modulating the transmit bit stream, the modulator 322 converts the stream to the analog domain using a digital-to-analog converter.

The conversion of the bit stream from the digital to analog domain produces unwanted harmonic artifacts. As such, the signal from the modulator 322 may be filtered using a low pass filter (LPF) 324 to remove the unwanted artifacts. After removing the unwanted harmonics, the analog signal is amplified using a power amplifier (PA) 326. The output of the PA 326 is then sent to a diplex filter (not shown) that provides an interface to the coax cable.

The host processor 314 may be any general-purpose microprocessor used to process upstream and downstream data. Typically, this processor 314 performs tasks associated with bridging Internet Protocol (IP) data between the network interface and the HFC network. The host processor 314 may also manage access to network resources.

The host processor 314 may receive access request and access control messages in several forms. These forms include data service request message (BES-REQ), dynamic service addition request (DSA-REQ), dynamic service change request (DSC-REQ), dynamic service deletion request (DSD-REQ), gate addition requests, and gate deletion request. The host processor 314 may also transmit control messages to the CTM. For example, the control messages may include a transmission control message also known as an upstream MAP message that contains transmission information for the upstream, sync message (SYNC) that contains timing information, and an upstream channel change message (UCC-REQ) that indicates the CTM should transmit on a new upstream frequency. Other examples of messages and message content are possible.

In support of host processor operations, the processor 314 may use volatile memory, non-volatile memory, or both volatile and non-volatile memory. Non-volatile information and instructions for the host processor may be stored in FLASH memory 316. Volatile information and instructions for the host processor may be stored in dynamic random access memory (DRAM) 318. Other types of memory may also be used.

The I/O block 320 provides an interface between the host processor 314 and the packet network. The exact functions provided by this device may be dependent upon the specific characteristics of the IP network. Examples of I/O device functions include 10 or 100baseT Ethernet, IP over SONET or ATM over SONET. Other examples of I/O functions are possible.

Figure 4:
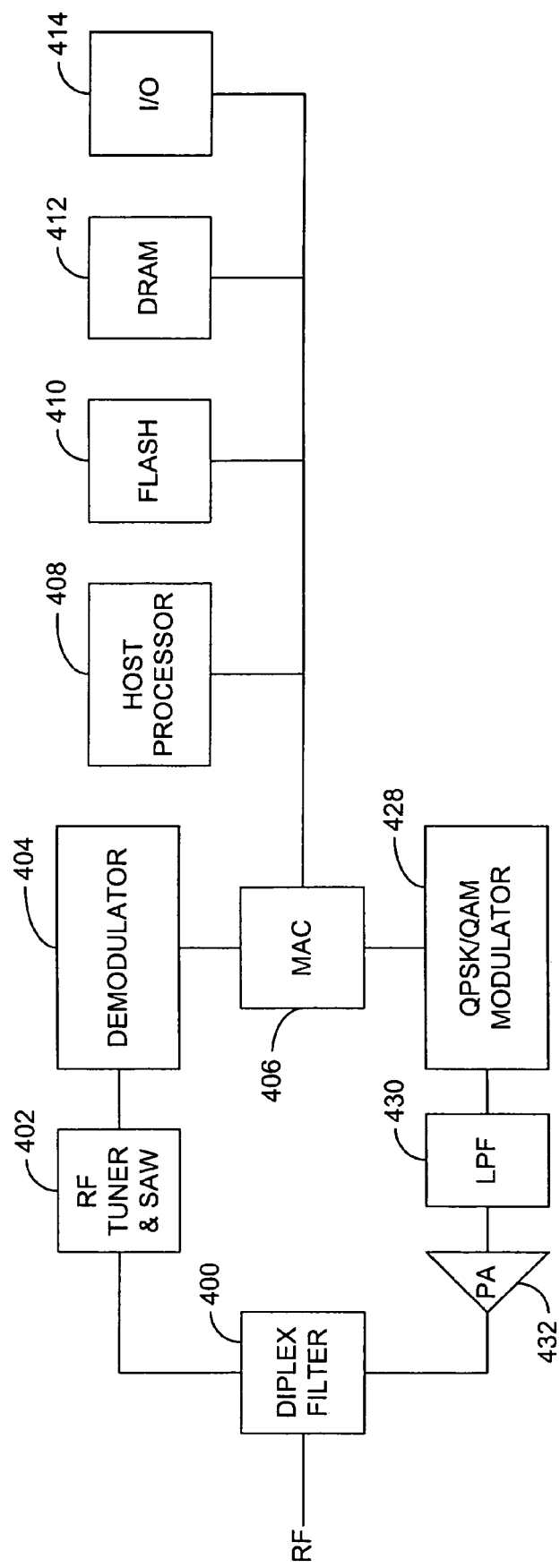
FIG. 4 shows a diagram illustrating the cable modem (CM) in accordance with a preferred embodiment of the present invention.

Referring now to FIG. 4, a diagram illustrating the CM is described. A diplex filter 400 is coupled to a RF Tuner and SAW filter 402. The RF Tuner and SAW filter 402 is coupled to a demodulator 404. The demodulator 404 is coupled to a MAC 406.

The MAC 406 is coupled to a QPSK/QAM modulator 428. The QPSK/QAM modulator 428 is coupled to a Low Pass Filter (LPF) 430. The LPF 430 is coupled to a Power Amplifier (PA) 432. The PA 432 is coupled to the diplex filter 400.

The MAC 406 is also coupled to a host processor 408, flash memory 410, DRAM 412, and I/O block 414.

A diplex filter 400 separates the input RF signals, for example, in the frequency range of 50 to 750 MHz, from the output signals and delivers the input RF signals to the RF tuner and SAW filter 402. The tuner and the SAW filter 402 down-converts the RF signals to IF frequencies. The down conversion process applies the RF input signal to the SAW filter. This down conversion process produces IF signals that are delivered to the demodulator 404.

The demodulator 404 produces the recovered bit stream from the IF input signal and the demodulation process recovers the bit steam. The recovery process may include analog-to-digital conversion, receiver amplitude correction, echo cancellation, timing tracking, frequency correction, and slicing. Other recovery techniques are possible.

The MAC 406 accepts the recovered bit stream from the demodulator 404 and formats the bit stream into blocks for delivery to the host microprocessor 408. In addition to formatting the recovered bit stream, the MAC 406 may perform error detection and correction on the recovered bit stream. The MAC 406 may perform decryption functions if the bit stream is encrypted. The MAC 406 also accepts data to be transmitted from the host microprocessor 408. Prior to delivering the transmit data to the modulator 428, the MAC 406 may add a cyclic redundancy code (CRC) to the transmit data block and may encrypt the transmit block. Additionally, the MAC 406 sends upstream timing and control information to the modulator 428.

The modulator 428 performs digital QPSK or QAM modulation on the bit stream from the MAC 206. The modulator 428 may also include a pre-equalization function. After digitally modulating the transmit bit steam, the modulator 428 converts the stream from the digital to the analog domain using a digital-to-analog converter.

The conversion from the digital to the analog domain may produce unwanted harmonic artifacts. As such, the signal from the modulator 428 may be filtered using the low pass filter (LPF) 430 to remove the unwanted artifacts. After removing the unwanted harmonics, the analog signal is amplified using the variable gain power amplifier (PA) 432. The output of the PA 432 is then sent to the diplex filter 400, which may provide an interface to a coaxial cable.

The host processor 408 may be any general-purpose microprocessor used to process upstream and downstream data. For example, the processor 408 may bridge Internet Protocol (IP) data between the I/O device 414 and the HFC network. The host processor 408 may also request access to network resources. The access requests may have several different forms. For example, a data service request message (BES-REQ), dynamic service addition request (DSA-REQ), dynamic service change request (DSC-REQ) and dynamic service deletion request (DSD-REQ). Other types of formats are possible.

The CM may also be responsible for receiving control messages from the CMTS and taking appropriate action based on these messages. The control messages may include a transmission control message also known as an upstream MAP message that contains transmission information for the upstream and an upstream channel change message (UCC-REQ) that indicates that the CM should transmit on a new upstream frequency. Other types of messages are possible.

The processor 408 may use volatile memory, non-volatile memory, or both volatile and non-volatile memory. Non-volatile memory information and instructions for the host processor 408 may be stored in the FLASH memory 410. Volatile information and instructions for the host processor 408 may be stored in the dynamic random access memory (DRAM) 412. Other types of memories are possible.

The I/O device block 414 may include a variety of input and output devices. For example, this block may include circuitry necessary for interfacing a 10 or 100baseT Ethernet and may include circuitry necessary for interfacing to a universal serial bus (USB). Other examples of circuitry or devices are possible.

Figure 5A:
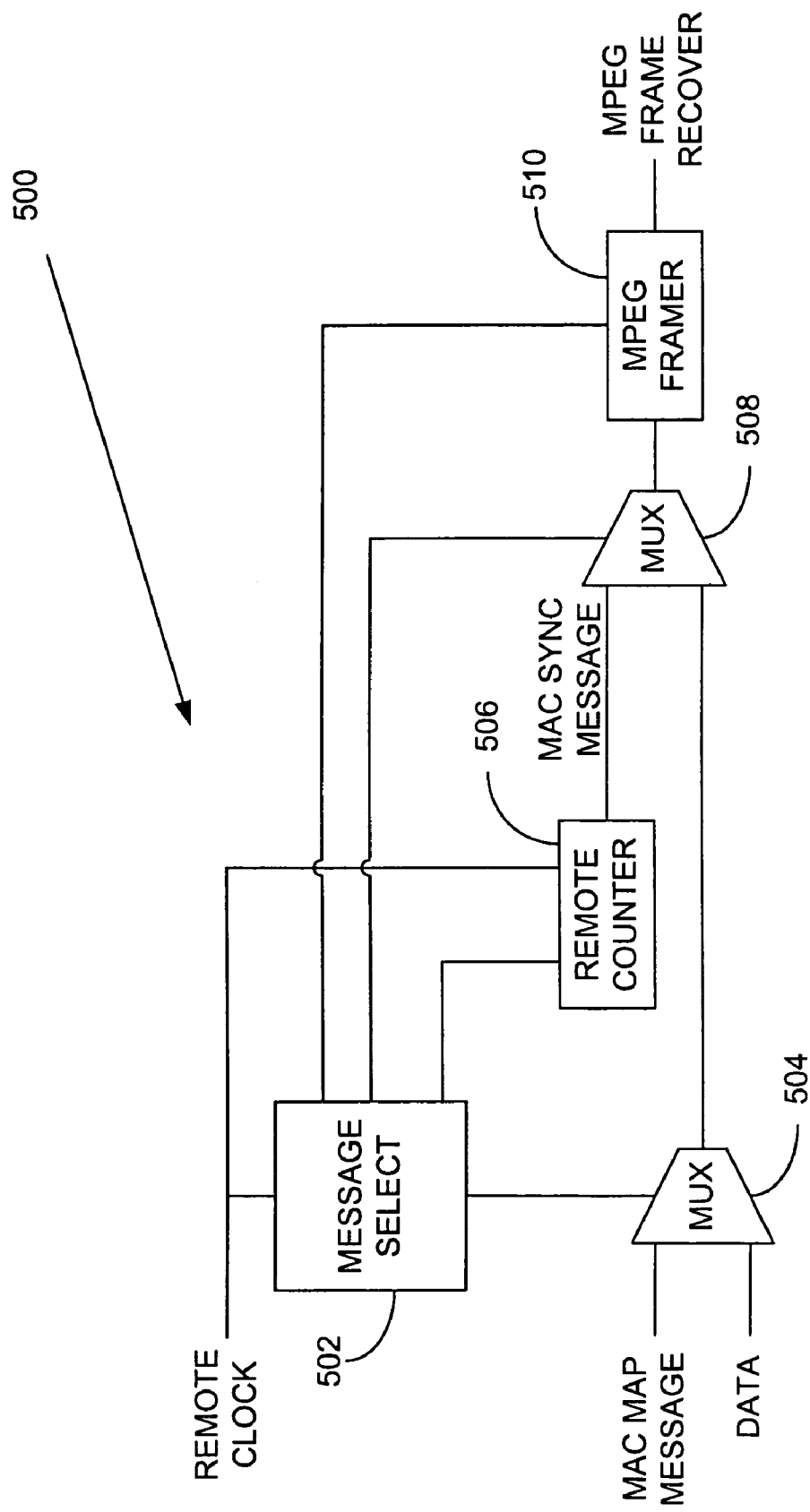
FIGS. 5A and 5B show a block diagram.
Figure 5B:
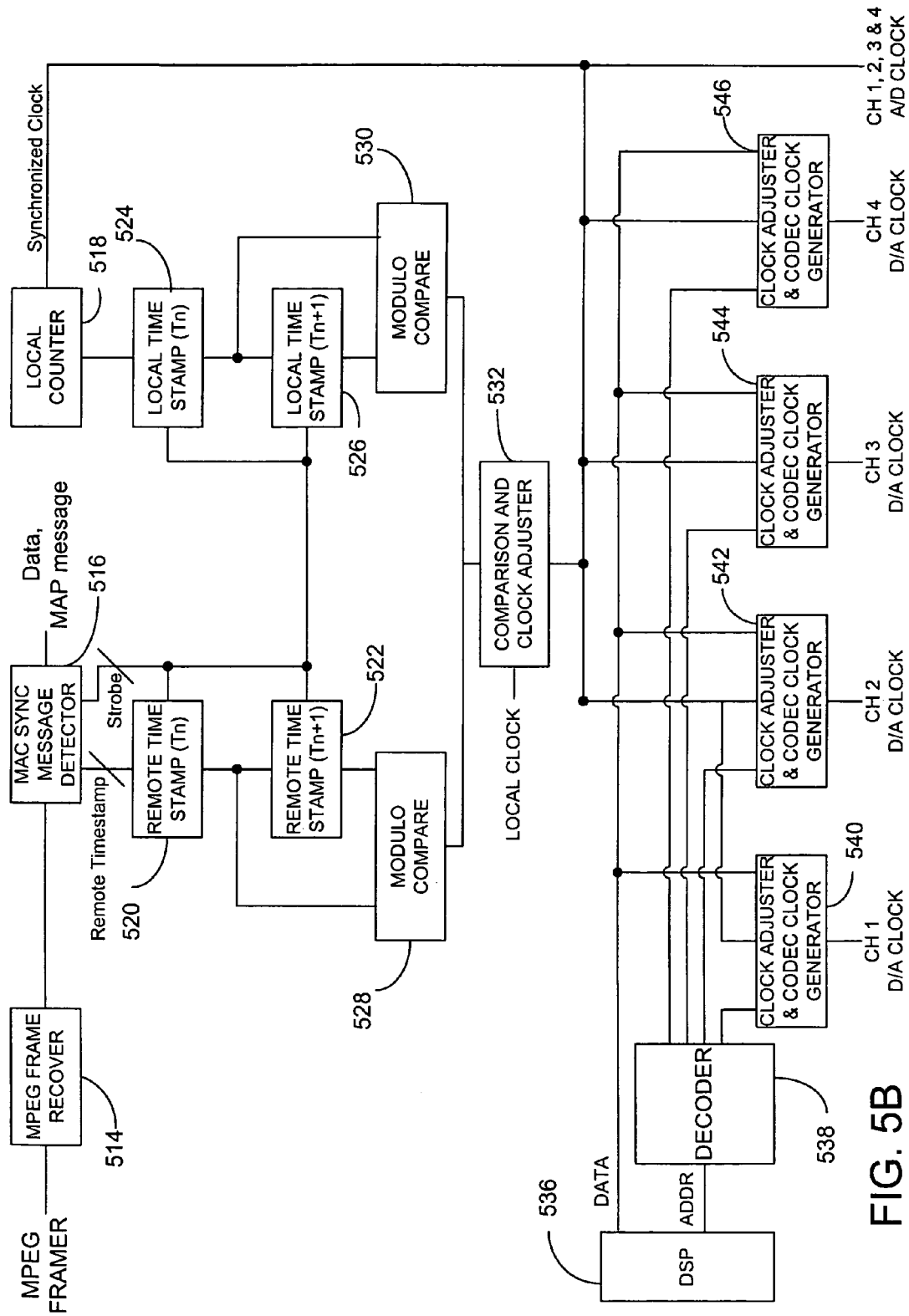

Referring now to FIGS. 5 and 5B, a block diagram of a system that provides for clock synchronization is described. As described below, a transmitting device 500, for example a CMTS, transmits information to a receiving device 500, for example a CM or CTM. It should be understood other implementations and other capabilities of the CM and CTM are possible.

A message select block 502 is coupled to a MUX 504, MUX 508, and remote counter 506. The MUX 504 is coupled to a MUX 508. The MUX 508 is coupled to a remote counter 506 and a MPEG framer 510. The MPEG framer 510 is coupled to an MPEG frame recover block 514 and is coupled to the message select block 502.

The MPEG frame recover block 514 is coupled to a MAC sync message detector 516. The MAC sync message detector 516 has a strobe, which is coupled to timestamp registers 520, 522, 524, and 526, and the MAC sync message detector remote timestamp is coupled to register 520. The registers 520 and 522 are coupled to a modulo compare block 528 and register 520 is coupled to register 522. The registers 524 and 526 are coupled to a modulo compare block 530 and register 524 is coupled to register 526. The modulo compare blocks 528 and 530 are coupled to a comparison and clock adjuster block 532. The comparison and clock adjustment block 532 is coupled to a local counter and a local clock. The local counter is coupled to register 524. The comparison and clock adjustment block 532 is also coupled to a plurality of digital-to-analog converters and a plurality of clock adjusters and CODEC clock generators 540, 542, 544 and 546. Of course, the plurality of clock adjusters and CODEC clock generators may alternatively be coupled to the local clock.

A DSP 536 is coupled to a decode block 538 and the DSP 536 is coupled to a plurality of clock adjusters and CODEC clock generators 540, 542, 544 and 546. The decode block is also coupled to a plurality of clock adjusters and CODEC clock generators 540, 542, 544, and 546.

The message select block 502 generates control signals used to multiplex the MAC MAP message and MAC SYNC message with the data for delivery to the MPEG framer 510. The message select block 502 operates in conjunction with the MPEG framer 510 to ensure proper information flow out of the MPEG frame 510. The MUX 504 and the MUX 508 are used to route multiple inputs to a single output. The MUX 504 chooses between data and a MAP message. The MUX 508 chooses between the output of MUX 504 and the synchronization message from the remote counter block 506. The MUX 504 and 508 are capable of storing information. MUX 504 stores data while outputting the MAC MAP message and MUX 504 stores MAC MAP messages while outputting data. MUX 508 stores MUX 504 output while outputting MAC SYNC messages and does not store MAC SYNC messages while outputting MUX 504 result.

The remote counter 506 generates a standard count or timestamp that is referenced to the remote clock and formats the timestamp into a MAC SYNC message. Generation of the MAC SYNC message is controlled by the message select block 502. The MAC SYNC message is generated at substantially periodic intervals.

The MPEG framer 510 may add error correction and/or detection information to the data received from the MUX 508. For example, the MPEG framer 510 may compute and add CRC data to the data received from the MUX 508.

The MPEG frame recover block 514 receives the message from the MPEG framer 510. The data and MAC MAP message portion of the message may be extracted. Error correction and/or detection may be performed. Of course, the MPEG frame recover block 514 may provide other functions, as well.

The MAC sync message detector 516 detects a MAC SYNC message. Each time a timestamp in the synchronization message is detected, the synchronization message detector 516 produces a detect strobe and the value of the timestamp associated with the MAC SYNC message. The strobe cause the value of the current timestamp to be stored in register 520 and the previous value of the timestamp to be stored in register 522. Additionally, the strobe causes the current value of the local counter to be stored in register 524 and the previous value of the local counter to be stored in register 526. Of course, if another type of message is used in place of the synchronization message, a block that detects that type of message may be substituted for the MAC synchronization message detector block 516.

The timestamp registers 520, 522, 524, and 526 store numerical values, which are representative of time. The values in these registers are latched by the strobe that comes from the MAC synchronization message detector 516. Any type of device that can store data can be used as a timestamp register.

The modulo compare block 528 and 530 compare two different inputs and make a determination concerning the difference between the two inputs. The modulo compare block 530 determines the period of the local (CM) clock, while the modulo compare block 528 determines the period of the remote clock.

The comparison and clock adjuster block 532 compares the periods of the remote clock and local clock as determined by the modulo compare blocks 528 and 530. The comparison and clock adjuster block 532 receives the local clock and adjusts the local clock to produce the synchronized clock. The comparison and clock adjuster block 532 may be implemented digitally as a modulo comparator and a pulse stretcher. Alternatively, the comparison and clock adjuster block 532 may be implemented as comparator, a digital-to-analog converter and a voltage controlled oscillator. Other implementations are possible.

The DSP 536 may be any type of digital signal processor, general processors or a cluster of general processor(s) and DSP(s). The DSP 536 receives data and MAC MAP messages from the MAC sync message detector 516 and performs any needed processing. The processing may include voice data compression and expansion, voice echo cancellation and conversion to and from PCM data representation. Additionally, the DSP 536 may provide a variety of tone generation and detection features such as dial tone synthesis, FAX detection, TDD detection and DTMF detection. Of course, other functions are possible.

The plurality of clock adjustors and CODEC clock generators 540, 542, 544, and 546 generate clocks to digital-to-analog converters based upon information received from the DSP. The clock adjusters and CODEC clock generators 540, 542, 544, and 546 may include a pulse stretcher. Alternatively, a digital-to-analog converter and a voltage controlled oscillator may be utilized.

Of course, other devices may also use the clocks generated by the plurality of clock adjustors and CODEC clock generators 540, 542, 544, and 546 and the synchronized clock generated by the comparison and clock adjuster block 532. An example of such a device is a clock adjusters, which is used to generate clocks for a plurality of analog-to-digital converters. Other types of devices are possible.

The plurality of clock adjustors and CODEC clock generators 540, 542, 544, and 546 and the comparison and clock adjuster 532 increases or decreases the frequency of clocks. They receive as input a clock and an indication of how much the period of the clock should be increased or decreased.

In one illustrative embodiment, the CMTS clock is used as the remote clock input to the message select block 502 and remote counter block 506. The MUX 504 receives MAC MAP messages from the CMTS host processor. Data (that the CMTS is sending to the CM or CTM) is also input into the MUX 504. At a particular time (e.g., at the end of a predetermined interval), the MAP message is generated and the MAP message is interleaved with data. At a particular time (e.g., at the end of a predetermined interval), the MAC SYNC message is generated and the MAC SYNC message is interleaved with output of MUX 504. The MAP message, data, and synchronization message (having a timestamp) are sent from the transmitting device (the CMTS) to the receiving device (CM). Specifically, the MAP message, data, and synchronization message are sent from the MPEG framer 510 to the MPEG frame recover module 514. As shown in FIG. 5, the MPEG framer 510 may be positioned in the transmitting device (the CMTS), while the MPEG frame recover module 514 may be in the receiving device (the CM or the CTM). Of course, other examples of the placements of elements shown in FIG. 5 are possible.

The MPEG framer 510 may add error correction and/or detection information, for example, CRC checksum information to any of the data, MAP message, or synchronization message. The receiver (the MPEG frame recover module 514) transmits the information to a MAC synch message detector 516.

The MAC sync message detector 516 receives the information (the MAP message, data, and the synchronization message). Each time the MAC sync message detector 516 detects the a synchronization message, the strobe causes timing values to be stored in the registers 520, 522, 524, and 526. The registers 520 and 524 have the current time value T(n), where n is some integer value. The registers 522 and 526 have previous time value T(n+1). Therefore, the start and ending times are recorded in the registers 522 and 526, and 520 and 524, respectively. The registers 524 and 526 are compared by the comparator 530; this yields a time period measurement relative to the receiver (e.g. the CM) clock. The registers 520 and 522 are compared by comparator 528; this comparison yields the period between successive synchronization messages or a measure of a time period relative to the transmitter (e.g. CMTS) clock. Then, the comparison and clock adjustment block 532 compares the period measured with the local clock and the period between the synchronization messages measured with the remote clock. Based upon the difference (if any), the CM or CTM clock (local clock) is adjusted by the comparison and clock adjustment block 532 such that the period measurements are equal.

The synchronized clock may also be adjusted based on the rate of the data received by the CM or CTM (not shown in FIG. 5). The DSP 536 receives the data that was transmitted by the transmitting device (the CMTS). The incoming data may either underflow or overflow at the DSP 536, based upon the rate it is received. If either of these situations occur, the DSP 536 may write a data value to the comparison and clock adjustment block 532 causing the modulo comparators 528 and 530 to have a fixed difference.

The plurality of digital-to-analog converter clocks may also be adjusted based on the rate of the data received by the CM or CTM. The DSP 536 receives the data that was transmitted by the transmitting device (the CMTS). The incoming data may either underflow or overflow at the DSP 536, based upon the rate it is received. If either of these situations occur, the DSP may write a value (e.g. data) into one of the plurality of clock adjustors and CODEC clock generators 540, 542, 544, and 546. The plurality of clock adjustors and CODEC clock generators 540, 542, 544, and 546 may use the value to increase or decrease a count associated with a pulse stretcher. As a result, if the pulse stretcher counts up to a value n, produces an output strobe (such as a terminal count indication), resets, and continues counting, then the value written to the pulse stretcher causes the value n to be changed based on the incoming data rate. The decoder 538 determines which of the plurality of pulse stretchers (in clock adjuster and CODEC clock generators 540, 542, 544, or 546) will receive the value (e.g. data). The output of the plurality of clock adjustors and CODEC clock generators 540, 542, 544, and 546 (such as a terminal count indication) may be used as a digital-to-analog converter clock that has been adjusted to take into account the incoming data rate.

Figure 6:
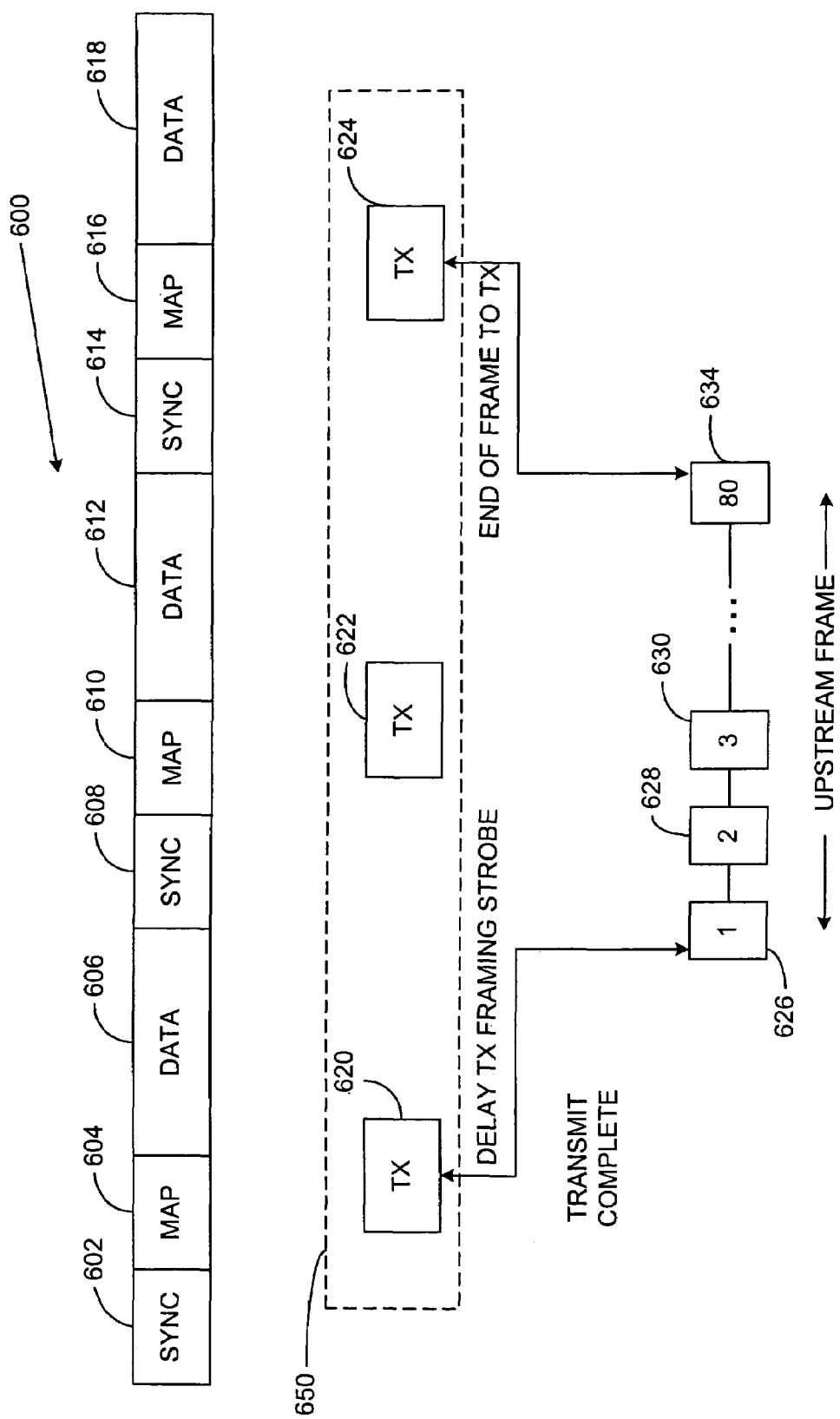
FIG. 6 shows a block diagram showing packet generation synchronization in accordance with a preferred embodiment of the present invention.

Referring now to FIG. 6, a block diagram illustrating low delay packet generation and synchronization enabled by clock synchronization is described. The CM or CTM receives a received information stream 600 from the CMTS. The received information stream 600 includes a synchronization messages 602, 608, and 614; MAP messages 604, 610 and 616; and receive data 606, 612, and 618. The CM or CTM transmits a transmit information stream 650 to the CMTS. The transmit information stream 650 includes transmit data 620, 622 and 624. The SYNC message 602, 608, and 614 indicates a time reference (e.g., a time stamp) to the receiver. The MAP messages 604, 610 and 614 indicate when the receiver (e.g., the CTM or CM) is to transmit the data 620, 622 and 624 with respect to the time reference indicated by the SYNC message 602, 608, and 614. The receive data 606, 612, and 618 indicates various command, control and general information for the receiver. The transmit data 620, 622 and 624 is composed of transmit information 626, 628, 630 and 634. The transmit information 626, 628, 630 and 634 indicates various command, control and general information for the transmitter.

In one illustrative embodiment and referring now also to FIGS. 2 and 4, after a transmission is completed to the CMTS, the MAC (e.g., the MAC 206 within the CTM or MAC 406 within the CM) generates an indication that the transmission to the CMTS is completed using an interrupt or strobe to a processor (e.g., the DSP 218 within the CTM or host processor 408 within the CM). The generation of the interrupt or strobe by the MAC is delayed, by a variable time period, to provide a delayed indication of the transmission. The strobe is used by the MAC to indicate to the processor to begin information acquisition for a subsequent transmission. The variable time period is modifiable by a processor device such as host processor 208 of FIG. 2, host processor 408 of FIG. 4, or DSP processor 218 of FIG. 2.

In another illustrative embodiment, the CMTS transmits the receive stream 600 and the receive stream 600 is received by the CM or CTM. The SYNC messages 602, 608, and 614 and the MAP messages 604, 610 and 616 indicate to the CM or CTM that the transmit information stream 650 is to be a time division multiple access (TDMA) information stream. The MAC (e.g., the MAC 206 within the CTM or MAC 406 within the CM) generates a framing interrupt to the processor (e.g, the DSP 218 within the CTM or host processor 408 within the CM). In response to the framing interrupt, the processor (e.g, the DSP 218 or host processor 408) begins acquiring information from CODEC and SLICs (e.g., CODEC and SLICs 220, 222, 224, or 226 or other I/O device). The processor (e.g., DSP 218 within the CTM or host processor 408 within the CM) writes a value to MAC (e.g., the MAC 206 within the CTM or MAC 406 within the CM) indicating the period between the end of transmission and the frame interrupt (i.e, the delay time period). It will be understood that other combinations of elements may be used to perform the above-mentioned functions, such as other processors or processing arrangements. Also, it will be understood that the content of the various messages may vary. For example, the MAP message may instruct the CM or CTM to transmit data in other formats besides the TDMA format.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for synchronizing two clocks may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A system for synchronizing the operation of a transmitter clock and a local reference clock, said system comprising:

a transmitter block, said transmitter block for transmitting consecutive synchronization messages, each of said messages having a timestamp, said transmitter block maintaining a transmitter counter having a value, wherein each of said timestamps indicates said value of said counter at successive moments of time;

a receiver, coupled to said transmitter block, for receiving said synchronization messages;

first and second synchronization registers, coupled to said receiver, said synchronization registers storing said timestamps of said consecutive synchronization messages;

a first comparator for comparing values of said first and second synchronization registers to produce a synchronization time period;

first and second local reference registers, coupled to a local counter, each of said first and second local reference registers having a value indicative of a local reference counter at successive moments of time;

a second comparator, coupled to said first and second local reference registers, said comparator comparing the values of said first and second local registers and determining a local reference time period; and a comparison and clock adjustment block, coupled to said first and second comparators and said local refererence clock, said block comparing said synchronization time period with said local reference time period and then adjusting said local reference clock based upon said comparison.

2. The system of claim 1 wherein data is transmitted from said transmitter to said receiver, said system further comprising:

a processor block, coupled to said receiver, for determining a transmission rate of said data; and a comparison and clock adjustment block, coupled to said local reference counter and said processor block, for adjusting said local reference counter based upon said determination of said rate.

3. The system of claim 2 wherein said comparison and clock adjustment block comprises a plurality of clock adjusters and CODEC clock generators, coupled to said processor block, for adjusting digital-to-analog converter clock based upon said determination of said rate.

4. The system of claim 1 wherein said transmitter further comprises a controller, said controller generating a strobe, said strobe delayed from the transmission of data by a programmable amount.

5. The system of claim 1 wherein said transmitter also transmits a MAP message to said receiver, said MAP message instructing said receiver to create a message having a TDMA format.

6. The system of claim 1 wherein said comparison and clock adjustment block includes a voltage controlled oscillator.

7. The system of claim 1 wherein said comparison and clock adjustment block includes a pulse stretcher.

8. A system comprising:

a hybrid fiber coax network;

a cable telephone modem (CTM) coupled to said hybrid fiber coax network, said modem having a local clock;

a cable modem termination system (CMTS) coupled to said hybrid fiber coax network and a packet network, wherein said CMTS includes means for sending successive synchronization messages, each of said synchronization messages having a timestamp, to said cable telephone modem;

wherein said cable telephone modem includes means for receiving said synchronization messages and determining a synchronization period, wherein said synchronization period is a time between successive timestamps; means for determining a period of said local clock; means for comparing said period of said local clock with said synchronization period to determine a difference, and means for adjusting said period of said local clock based upon said difference.

9. The system of claim 8 wherein said CTM includes means for receiving data from said CMTS, means for determining a rate of said data, and means for adjusting the period of said local clock based upon said rate.

* * * * *